Nov. 7, 1944.  F. HUNZIKER  2,362,071
INDEXING CHUCK
Filed March 19, 1943  2 Sheets-Sheet 1

INVENTOR
FRED HUNZIKER
BY
George M. Soule
ATTORNEY

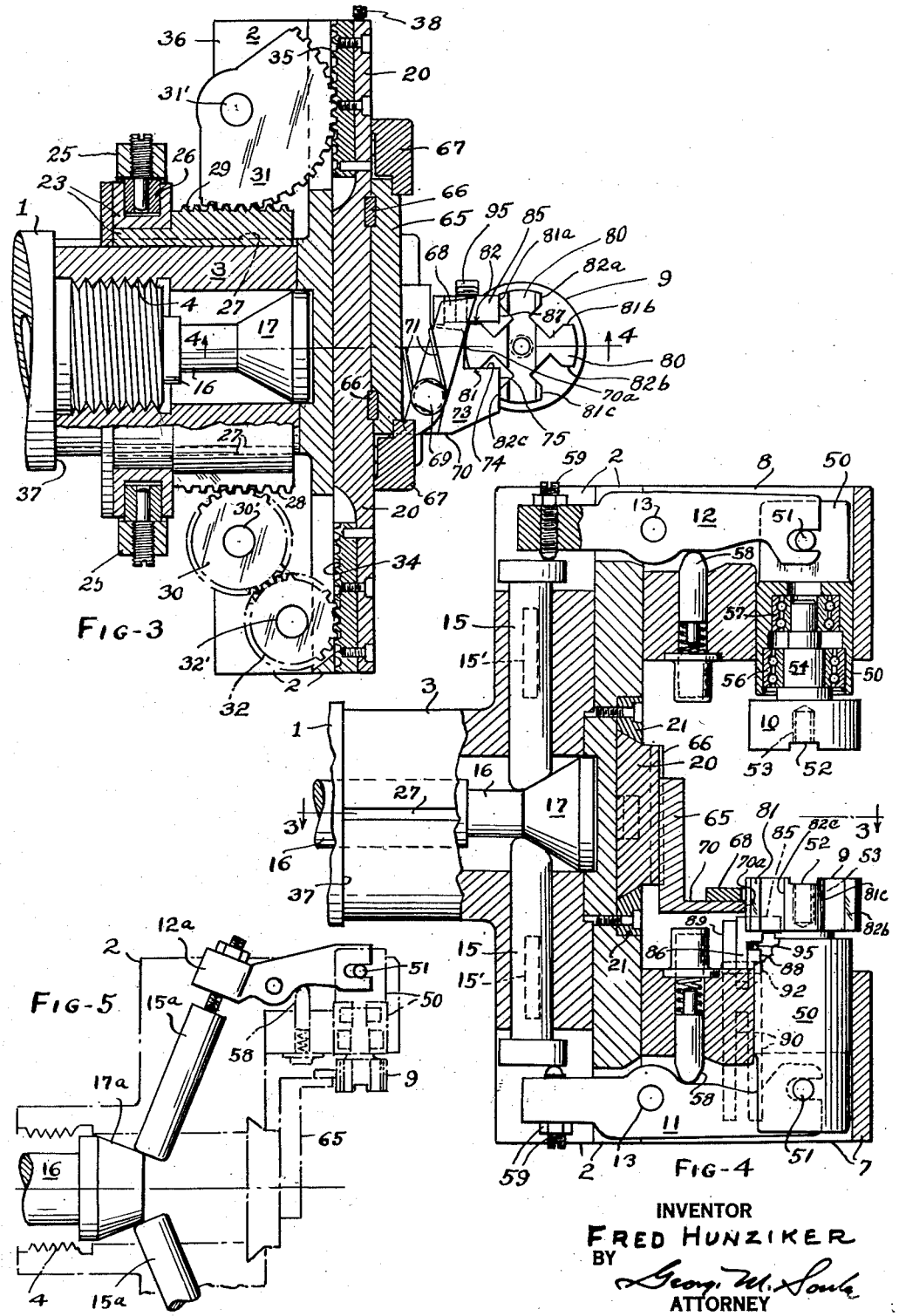

Patented Nov. 7, 1944

2,362,071

UNITED STATES PATENT OFFICE 2,362,071

INDEXING CHUCK

Fred Hunziker, Cleveland, Ohio, assignor of one-half to The W. J. Schoenberger Company, Cleveland, Ohio, a corporation of Ohio Application March 19, 1943, Serial No. 479,760

17 Claims. (Cl. 279—5)

This invention relates to an indexing chuck mechanism for turret lathes and other machine tools, said mechanism being on the order of that shown in my prior United States Patents 1,801,601 and 1,801,602, issued April 21, 1931 (hereinafter, for convenience, patents A and B, respectively). Both said patents show the same chuck mechanism, patent "B" showing more in detail an illustrative manner of mounting the mechanism on a turret lathe, fluid operated means to cause jaw elements of the chuck to grip and release work in the chuck. Both patents show means for indexing the jaw elements with work therein while the lathe spindle is rotating. It will be assumed for the sake of brevity hereof that the present mechanism is arranged for operation in conjunction with a turret lathe or other machine tool the same as shown, disclosed or indicated by either or both of said patents.

An object of the present invention is to provide an improved indexing chuck mechanism. Other objects are to provide such a mechanism having: (a) an improved and simplified indexing ratchet and locking or retaining means for an indexable work holder; (b) an improved unitary carrier or slide for the ratchet means and an improved manner of mounting and actuating the same on a suitable support; (c) an improved chuck jaw operating means for gripping and releasing work in the chuck; (d) improved cam operated arrangements for actuating the jaws to closed position; (e) an improved arrangement for enabling the size of work which can be supported and indexed to vary considerably without sacrifice of accuracy, stability or production speed when handling either large or small work pieces; (f) an improved manner of adjusting work retaining and indexing elements on an indexing chuck in order more effectively to enable a single embodiment of the mechanism to handle large and small work with approximately equal precision and speed; and (g) improvements in respect to advantageously balancing the main rotary chuck mechanism support to the end of minimizing strain and wear on the main spindle bearings while utilizing some degree of unbalance as to certain parts of the mechanism for the purpose of maintaining the work firmly in accurately indexed position during the times while cutting operations are being performed on the work.

Figure 1:
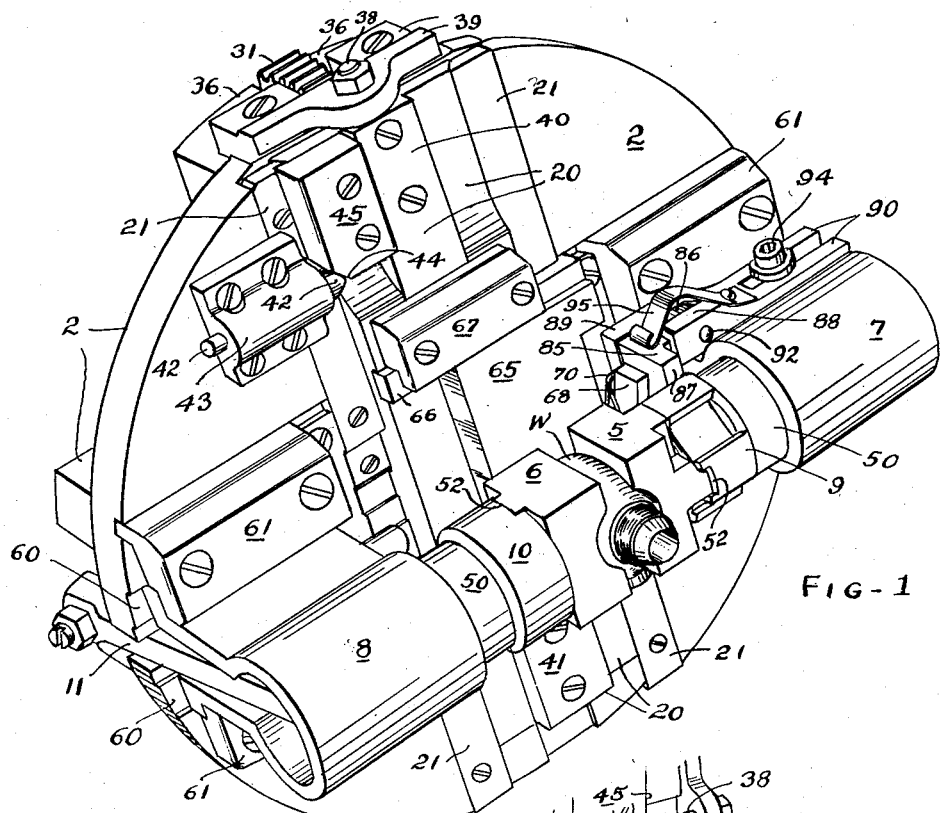
Figure 2:
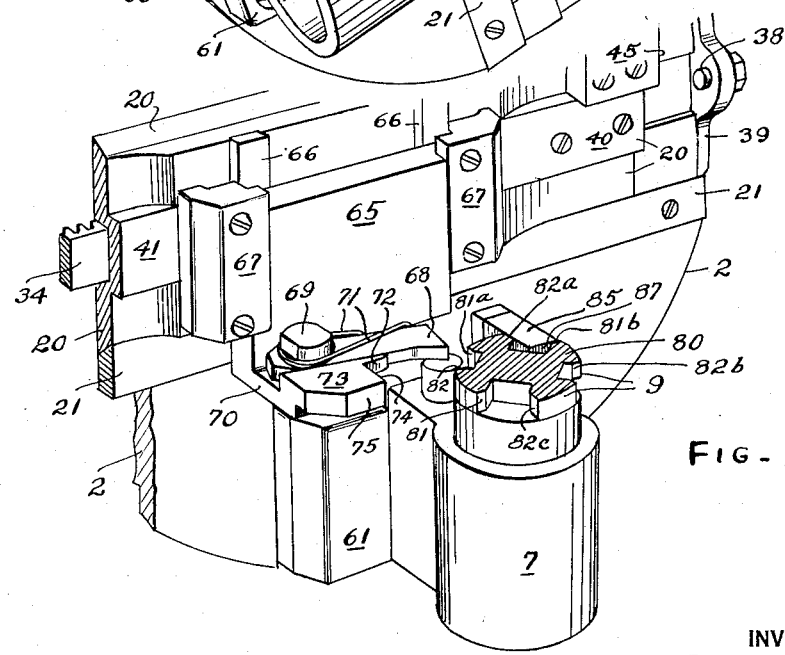

Other objects and features of the invention will become apparent from the following description of illustrative embodiments thereof shown in the accompanying drawings, wherein:

Fig. 1 is a perspective view of the indexing chuck mechanism and main supporting rotary frame or body; Fig. 2 is a detail sectional perspective view thereof in a differently turned position of the frame or body; Fig. 3 is a central sectional assembly view of the chuck mechanism mounted on a lathe spindle; Fig. 4 is a central sectional view taken in a plane substantially at right angles to Fig. 3 about the lathe spindle axis; and Fig. 5 is a fragmentary view showing a modified mechanism for opening and closing work holding jaws of an indexing chuck such as that of Figs. 1 to 4.

Parts of the mechanism herein shown and which require no special description in view of the state of the art generally are as follows: Tubular lathe spindle 1 (Fig. 3); generally circular chuck rotary frame or body 2; shank 3 of the frame or body 2, which shank may be screw threaded at 4 onto the lathe spindle; chuck jaws 5 and 6 (Fig. 1 only), oppositely recessed to receive the work; guiding brackets 7 and 8 on the frame or body 2 for respective indexable supporting heads 9 and 10 for the respective jaws, jaw head operating rocker arms 11 and 12 (see Fig. 4), fixed pivots 13 of which arms are preferably supported on the brackets 7 and 8; push rods 15 (Fig. 4) slidable in the body 2 for operating the rocker arms, and an axially reciprocable jaw operating bar 16 in the tubular spindle and having a cam surfaced head 17 (improved arrangement) simultaneously engaging both push rods to actuate the rocker arms in a direction to bring the jaws 5 and 6 into clamping relation to the work.

Also generally known, in view of said patents "A" and "B," is a slide bar 20 in a suitable retaining guideway structure 21 on the front face of the chuck frame or body 2, and extending at right angles to the indexing axis of the work gripping jaw supporting heads 9 and 10, for carrying indexing and locking elements (improvements later described herein) acting on special shoulders of the head 9 (improved form described later) which head 9 is drivingly rigid with the jaw 5 (as shown) for indexing the work while the two jaws are gripping the work. Patents "A" and "B" show also a sleeve constituting a peripherally grooved shifting collar generally on the order of that shown in Fig. 3 hereof at 23, slidably keyed on the shank 3 of the frame or body 2 and having means coupled therewith for reciprocating the index-mechanism-supporting slide bar 20 during rotation of the chuck to perform the work-jaw indexing and locking operations.

In the improved arrangement the sleeve or collar 23 has positive gear drive connections with opposite ends of the slide bar 20, enabling the slide bar to be actuated positively and easily, as by hand in opposite directions, said gear arrangement requiring no weight or weights to be added to the chuck mechanism for practically adequate balancing, so that only the indexing slide bar assembly, which is relatively light in weight, imposes any unbalance to the chuck mechanism generally and then only temporarily (during the indexing operation, which can and usually is performed in less than a second).

Yoke arms 25 (Fig. 3) of the shift lever of suitable form pivoted fixedly on the turret lathe on an axis transverse to the spindle axis operate the grooved collar 23 as through suitable shoes 26 conventionally attached to the yoke arms, and the collar 23 may be slidably keyed to the shank 3 as at 27. The collar 23 has diametrally opposite longitudinally extending toothed racks 28 and 29 (Fig. 3 only) respectively in constant mesh with gears (one segmental) 30 and 31. The gear 30 is in constant mesh with a reversing idler gear 32 and the gears 31 and 32 are in constant mesh with toothed racks 34 and 35 respectively secured to the rear side of the slide 29 which carries the ratchet mechanism (described later). The gears 30, 31 and 32 are freely turnable on pins 30', 31' and 32' bridging parallel radial arm portions 36 of the body 2 spaced substantially the thickness of the various gears. The movement of the slide 20 in one direction is limited by the collar 23 which abuts a shoulder 37 of the spindle, said direction being that in which the indexing mechanism prepares to perform an indexing and locking operation on the head 9. Movement of the slide in the poposite direction is adjustably limited by an abutment screw 38 (Figs. 1 and 2) carried on a bracket 39 attached to the body 2 in overhanging relation to one end of the slide 20. The screw abuts one end of one one of two central raised ribs 40 and 41 of the slide beneath which ribs the racks 34 and 35 are secured.

When the slide 20 moves into abutment with the screw 38, the slide is releasably but firmly held in position against displacement out of that position (as due to vibration of the lathe or from other cause) by a spring detent plunger 42 (Fig. 1) slidable in a block 43 on the body 2 and which cooperates with a beveled detent surface 44 on a block 45 fixed to the slide 20. The slide 20 may extend equal distances on opposite sides of the spindle axis (see Fig. 3) in the work precisionizing position of the ratchet and locking mechanism carried by the slide 20, or (as shown by Fig. 1 only), the slide 20 may be slightly off center toward the abutment screw 38 in said position, so that centrifugal force, acting on the slide 20, is added to the acting force of the detent plunger 42 in retaining the mechanism in position.

The jaw supporting heads 9 and 10 are mounted on bearing assemblies (one fully shown in Fig. 4 but both alike) including cylindrical plungers 50 freely but snugly slidable in the guides 7 and 8 and having connecting pins movable in the rocker arms as evident from Fig. 4. The heads 9 and 10 have transverse diametral grooves 52 for receiving the jaw blocks 5 and 6 and threaded holes 53 for receiving jaw clamping screws (not shown). Additionally, the heads 9 and 10 have respective integral spindle or shank portions 54 (one shown) journalled for free rotation in the plungers as on double antifriction bearing assemblies 56 and 57 which resist both axial and radial or side thrust.

The jaw supporting assemblies are preferably biased outwardly as by spring plungers 58 mounted in respective brackets 7 and 8 and acting radially outwardly on the rocker arms 11 and 12. The rocker arms have adjustable connections (screw and lock nut assemblies 59) with the push rods 15 so that the work (piece W, Fig. 1) can be accurately adjusted to the center of the chuck and firmly gripped, and also in order for compensating adjustment when the heads 9 and 10 are spaced different distances apart as by moving the brackets 7 and 8 in radial ways 60 toward and away from the chuck center. The brackets 7 and 8, when properly adjusted for a given size of work piece, are fastened in position on the body 2 by means of clamping plates 61 overhanging respective flange portions of the brackets.

The push rods 15 have their inner ends shaped generally complementary to the cam portion 17 of the central operating rod 16 of the spindle. The push rods may be of circular section and keyed as at 15' to hold said inner ends in proper relationship to the cam. The cam form (conical and diverging toward the body 2), is of special advantage in that it can be used to prevent the chuck from becoming accidentally unscrewed from the spindle at threads 4 (as by inertia, upon stopping or reversing the lathe spindle), assuming the opposite end of the cam actuating rod or bar 16 is positively limited by suitable abutment means associated with said opposite end, as usually is the case. For example, the rod or bar 16, if attached to a piston of an air operated motor as in said patent "B," would be limited by abutment of the piston with suitable abutment means in the associated cylinder in which the piston operates. The piston in the case of Figs. 3 and 4 hereof would move in a direction opposite the direction of operation according to Fig. 5 hereof and said patents "A" and "B" in actuating the work holding jaws to work-gripping position.

In the rocker arm operating cam and push rod arrangement according to Fig. 5 hereof, wherein the chuck body and other parts are shown diagrammatically in outline only, the conical cam surface 17a of the end of the reciprocably movable rod or bar 16 converges toward the main body of the chuck and the push rods 15a are directed substantially at angles normal to respectively acting cam faces. The Fig. 5 arrangement has certain advantages, namely; a high degree of efficiency as to the cam and push rods; capability of use with simple push rods of cylindrical form requiring no keys such as 15' of Fig. 4; and, in addition, capability of effective operation on relatively short ends of the rocker arms 12a for greater opening and closing movement of the chuck jaws 5 and 6 incident to a short operating distance of travel of the cam rod or bar 16.

For indexing and precisionizing the work upon reciprocating movement of the slide 20, as by the sleeve and gear mechanism hereinbefore described, the slide 20 has thereon a mounting plate 65 the base of which constitutes a cross slide, being mounted on rails 66 and provided with clamping brackets 67 (Figs. 1 and 3) of conventional form for securing the plate 65 in properly adjusted position in accordance with the position of the indexing and locking head 9 which may operate in a variable range of positions along the axis of the head-operating plungers 50 as previously described.

As best shown in Fig. 2, an indexing ratchet pawl 68 is pivotally mounted on an arm 70 of the plate 65, as on a pin 69 having a head overlying and retaining a coil of a suitable spring 71 acting on the pawl to urge the free end thereof toward the head 9. The arm 70 has an abutment 72 for the limiting of swinging movement of the pawl toward the head 9.

A relatively raised portion 73 of the arm 70 has surfaces 74 and 75 at right angles to each other which act against complementary relatively indented surfaces of the head 9, when the slide 20 is in the position thereof shown in Figs. 1 and 3, to hold the head 9 positively against turning in either direction. More specifically, the head 9 is coarsely fluted and of generally cross shaped section (see Fig. 2) providing peripherally identical arms 80 spaced 90° from each other in the particular form shown; and the arms 80 have opposite head surfaces in pairs 81, 82; 81a, 82a, etc., to 82c as indicated on Fig. 3. The pawl 68 successively engages the faces 81, 82a etc. to index the head 9 through a partial indexing turn thus partly indexing the work W and head 10; and the face 74 of the fixed arm portion 73, after the indexing has been partially performed by the pawl 68, completes the indexing operation, and, by rotating the head 9 until one of the relatively leading surfaces thereof (e. g. 82c, Fig. 3) is brought into abutment with the surface 75 of the raised arm portion 73, positively precisionizes the head 9 in indexed position.

The indexing and precisionizing operations can perhaps be more clearly understood first by reference to Fig. 2 as exhibiting the movement of the slide 20 to the left, Fig. 2, preparatory to indexing, and showing the pawl 68 ready to engage the arm surface 81a of the head 9; and second, by reference to Fig. 3, showing: the slide 20 moved back—as to the right Fig. 2, upwardly in Fig. 3—into abutment with the screw 38 (top of Fig. 3); the pawl in the position after it has partially indexed the head 9, and the arm surface 74 in the position after it has completed the indexing movement of the head, by engagement with head surface 81, and has moved the head surface 82c against the arm surface 75, completing the precisionizing operation. The spring plunger 42 (upper left, Fig. 1) is shown in position against the beveled surface 44 which, in cooperation with the abutment screw 38, holds the slide 20 in final position until an operation or one series of operations has or have been performed on one portion of the work piece (e. g. turning, drilling, screw threading etc.).

During the first part of the indexing operation on the head 9, the head—which can always turn very freely in its bearing support 56, 57 notwithstanding considerable gripping pressure of the jaws on the work—is prevented from the turning too far and from reverse rotation by a pivotally and yieldably mounted index-head-restrainer and locking arm or bar 85 which is situated opposite or beyond the particular arm 80 of the head being acted upon (as in Fig. 3) by the precisionizing surface 74 of the bracket 70. The restrainer and locking arm 85 is L-shaped, having a leg 86 extending between two parallel arms 88 and 89 of an H-shaped bracket 90. The pivot pin 92 for the restrainer and arm bridges the parallel arms of the bracket.

The bracket 90 is mounted on the head-plunger-supporting bracket 7, parallel thereto, as by a clamp screw 94 for adjustment of the restrainer arm 85 into proper relationship to the head 9, parallel to the axis of the latter. A leaf spring 95, secured to the H-shaped bracket 90, bears on the restrainer and locking arm 85 in position to urge the arm 85 toward the face (e. g. 82) instantaneously engaged by the adjacent side face of the arm 85. As the head 9 is indexed the engaged face of the head pushes the arm 85, about its pivot 92, out of the way of the arm 80 and the arm 85 then drops back to a new position against the next face (e. g. 82).

The index-head-locking function of the arm 85 is accomplished by reason of an end face 87 of said arm disposed at right angles to the pivot axis (pin 92) so that said end face, after the spring-restrained pivotal movement of the arm 85 described above, swings into sliding abutment with the instantaneously adjacent trailing surface of the head 9. The operation is illustrated by Fig. 3 wherein the end face 87 of the arm is shown in abutment with the surface 81a of the head 9. Said end surface 87 may be slightly beveled for wedging locking action on the surface 81a or may be parallel to the surface 81a, as desired. In Fig. 2 the same relationship of the end face 87 of the arm 85 and a trailing face of the head is shown, but specifically to face 81b of said head because of the differently turned position of the head in Fig. 2. Since the arm 85 is snugly fitted between the arms 88 and 89 of the bracket 90 and the bracket 90 is clamped rigidly to the bracket 7, so that it cannot yield, the head 9 is positively prevented from being turned out of indexed position in a direction reverse to the indexing rotary movement, due for example to the force of the spring 95 or other cause, just prior to the time the surface 75 of the arm 70 moves into full abutting relationship to the relatively trailing arm surface (e. g. surface 81, Fig. 3) of the head. After the indexing has been completed (Fig. 3) the surfaces, namely 87 of the pivoted arm 85 and 75 of the fixed arm portion 73 of the arm 70 cooperate as a positive locking means to prevent turning of the head 9 in either direction irrespective of any slight movement of the slide 20 which might take place.

In view of the overhang of the heads 9 and 10 from their supporting bearings, abutment of one or both of the heads by fixed parts of the cross slide 65 may be effected along a plane passing through the centers of the heads and coincident with the working axis of the lathe tool (e. g. in case of a drill or threading die). This is illustrated in Figs. 3 and 4 wherein a free edge surface 70a of the rigid arm 70 is shown in tangential abutting relation to the peripheral circular face of one of the arms 80 of the head 9. Such plane as mentioned above is represented by the sectional plane of Fig. 4 (indicated by line 4—4 on Fig. 3).

The present chuck mechanism, it will be observed, is very sturdy, and the accuracy and speed of presentation of different branches of elbow, "T" and cross fittings (for example) to the tools of a turret lathe or similar production machine tool greatly speeds up production of such work.

While not illustrated herein the present mechanism can be re-arranged (as by duplicating the indexing pawl and locking mechanism 68, 74, 75 in spaced effectively oppositely acting relationship along the slide 20 and omitting the pivoted arm 85 and its supporting brackets, in which case the slide would have positively limiting but adjustable abutments as at both ends— e. g. two screws 38—one for each final work-locking position of the slide), for indexing parts such as elbow fittings to and fro through 90° or other angles instead of indexing always in one direction of rotation. Said patent "A" has (Fig. 17 thereof) a similar arrangement for reverse indexing in a non-stop indexing chuck, which arrangement is deemed to constitute a sufficient complementary illustrative showing of said rearrangement for reverse indexing just explained herein.

In cases of work having, for example, three branches radiating from a common center, the head 9 would have three arms 80 in respectively appropriate angular relationship about the head center; but the indexing and precisionizing mechanism hereof would not require essential modification.

I claim:

1. An indexing chuck having a gripping jaw assembly rotatable on an axis transverse to the main axis of rotation of the chuck for enabling indexing of the work, a slide movable transverse to said main axis during rotation of the chuck, a fluted head on the jaw assembly providing radially disposed arms spaced equally about the axis of the head, means on the slide arranged to index the work by intermittent engagement with the arms, said means including a follow-up rigid indexing and locking means which engages relatively leading and trailing surfaces of adjacent arms of the head to lock the head in indexed position against turning in opposite directions.

2. An indexing chuck having a gripping jaw assembly rotatable on an axis transverse to the main axis of rotation of the chuck, a slide mounted on the chuck for movement transverse to one of said axes, a head on said assembly having arm portions with parallel faces at right angles to each other and extending axially of the assembly, and indexing and precisionizing means on the slide including a part normally rigid with the slide and having mutually rigid abutment surfaces at right angles to each other and arranged simultaneously to engage respective relatively opposite faces of two adjacent arm portions.

3. An indexing chuck having a gripping jaw assembly comprising coaxial rotary mounts for two jaws transversely of the main chuck axis, a fluted head on one of the mounts, a slide movable across the front face of the chuck adjacent the fluted head, yielding means on one of the mounts arranged to engage the head while yieldable tangentially of the path of rotation of the head to restrain free turning of the head, and indexing pawl mechanism carried on the slide and engageable with the head to turn it positively against the restraining force of said yielding means.

4. An indexing chuck having coaxial rotary mountings for work gripping jaws, an indexable head having radially disposed arms spaced about the axis of the head and carried by one of said mountings, a slide movable across the face of the chuck which is presented toward the mountings, means for reciprocating the slide while the chuck is being driven, a pawl pivoted on an arm of the slide and aranged to perform a partial indexing operation on the head during movement of the slide in one direction, and locking means on the slide engaging the head during a further movement of the slide in said one direction in a manner first to complete the indexing operation and then lock the head against rotation by engagement with faces of angularly adjacent arms of the head.

5. The arrangement according to claim 4 wherein the locking means is a rigid part of a carrier for the pawl.

6. An indexing chuck having mountings for supporting gripping jaws for indexing rotation on an axis transverse to the main rotational axis of the chuck, a slide independent of both mountings and disposed centrally on a face of the chuck which is presented adjacent the mountings, said slide being diametrally arranged on the chuck across said main axis, and indexing and locking means carried by and projecting from the slide at one side of said main axis into cooperative indexing and locking relationship to one of said mountings.

7. The arrangement according to claim 6 wherein the mountings are radially adjustable on the chuck, said slide carries a cross slide movable parallel to the mounting adjustment axis and the indexing and locking means are carried by the cross slide.

8. An indexing chuck having coaxial rotary work gripper mountings radially movable transverse to the main rotational axis of the chuck for gripping and releasing work, a slide carried by the chuck, an indented wheel on one of the mountings, said wheel having arms with opposite parallel faces, indexing means carried by the slide including a part engageable with faces of two adjacent arms of the wheel, and a restraining device yieldingly movable in a direction tangentially of the path of movement of the arms, engageable with a face of one of the said arms opposite the face of that arm engaged by said part of the indexing means.

9. An indexing chuck having coaxial rotary mountings for work grippers, an indexing slide mounted for movement across a front face of the chuck, indexing mechanism carried by the slide and cooperating with one of the mountings, central chuck mounting means at a rear portion of the chuck, reciprocatable means associated with the chuck mounting means, and a gear driving connection between the reciprocatable means and one end of the slide and arranged to move the slide positively to and fro to perform indexing operations.

10. An indexing chuck having coaxial rotary work gripping jaw assemblies, an indexing slide mounted for movement across a front face of the chuck, indexing mechanism carried by the slide and cooperating with one of the assemblies to turn the same for indexing the work, a central mounting shank on a rear portion of the chuck, a sleeve slidable on the shank, and a gear driving connection including a rack on the sleeve, a rack on the slide and a gear on the chuck operatively in mesh with both racks.

11. The arrangement according to claim 10 wherein the sleeve has oppositely driving substantially balanced geared connections with opposite end portions of the slide.

12. An indexing chuck having a pair of coaxial rotary work grippers at one end spaced on opposite sides of the main rotational axis of the chuck, an indexing slide adjacent the work grippers and reciprocable in a straight line to index one of the grippers, means slidable on the end of the chuck opposite the work grippers, and rotary gear members interposed between and operatively in mesh with racks of said means and indexing slide whereby positively to move the rack in opposite directions.

13. An indexing chuck according to claim 12 wherein said slide is diametrally arranged on the chuck and the rotary gear members include a first gear meshing with a rack on one end of the slide and other gear members in balancing arrangement relative to the first gear and in operative meshing relationship to a rack on the other end of the slide.

14. An indexing chuck having coaxial rotary work gripper mountings radially movable transverse to the main rotational axis of the chuck for gripping and releasing work, a slide carried by the chuck, an indented wheel on one of the mountings, said wheel having arms with opposite parallel relatively leading and trailing faces, indexing means carried by the slide including a part engageable with a relatively leading face of one of the arms to lock the wheel against rotation out of indexed position in one direction and another part which is yieldable in the indexing direction of rotational movement of said arm and returnable after such yielding into position to engage a relatively trailing face of another arm to lock the wheel against rotation out of indexed position in the opposite direction.

15. The arrangement according to claim 14 wherein said other locking part is a yieldably positioned arm on a fixed pivot normal to the face of the yieldably positioned arm which lockingly engages such relatively trailing surface of the wheel.

16. In a non-stop indexing chuck including a main body having a pair of opposite coaxially mounted rotatable work gripping assemblies including a pair of jaw supporting heads one of which is generally circular, means slidable across the face of the main body which lies adjacent said assemblies and at right angles to the axis of said assemblies for indexing one of the assemblies by intermittent operation on one of the heads, and rigid means on the slide continually tangentially abutting the circular head surface on the side of the head toward the slide after performance of each indexing operation and in a plane coincident with said axis of said assemblies.

17. An indexing chuck comprising a main rotary body having a rear end portion adapted to be attached to a lathe spindle or similar machine, transverse, coaxial indexable work gripping jaw mountings at the forward end of the body and means for indexing one of the mountings, one of said mountings being movable diametrally of the chuck to enable work to be placed in the jaws, a rocker arm connected with said movable mounting and extending in a plane coincident with the axis of rotation of said body, an axially shiftable cam coaxial with the body adjacent said rear end thereof and a push rod extending obliquely and forwardly from the cam to one end of the rocker arm.

FRED HUNZIKER.